United States Patent [19]

Sakata

[11] Patent Number: 5,750,266
[45] Date of Patent: May 12, 1998

[54] SLIDING MATERIAL FOR LIGHT METAL MATERIALS

[75] Inventor: Tatsuei Sakata, Kashiwazaki, Japan

[73] Assignee: Kabushiki Kaisha Riken, Tokyo, Japan

[21] Appl. No.: 654,590

[22] Filed: May 29, 1996

[51] Int. Cl.$^6$ .......................... B32B 15/08; B65D 53/06
[52] U.S. Cl. ........................................ 428/457; 277/227
[58] Field of Search ........................ 428/457, 615, 428/463, 460, 524, 501, 413; 277/96, 96.2, 227

[56] References Cited

U.S. PATENT DOCUMENTS

| | | | |
|---|---|---|---|
| 4,592,782 | 6/1986 | Davies | 75/253 |
| 5,039,575 | 8/1991 | Mori et al. | 428/463 |
| 5,124,397 | 6/1992 | Kanazawa et al. | 524/496 |
| 5,131,818 | 7/1992 | Wittkop et al. | 417/273 |
| 5,271,679 | 12/1993 | Yamazumi et al. | 384/547 |
| 5,573,846 | 11/1996 | Harig et al. | 428/323 |

FOREIGN PATENT DOCUMENTS

5-262976  10/1993  Japan.

*Primary Examiner*—John J. Zimmerman
*Assistant Examiner*—Michael LaVilla
*Attorney, Agent, or Firm*—Kubovcik & Kubovcik

[57] ABSTRACT

A sliding material for light metal material contains polyether-ether ketone and/or polyether-nitride. Further, 20~35% of sericite is added in the sliding material as a solid lubricant to improve self-wear resistance of the sliding material and wear resistance of a mating part with respect to the sliding material.

6 Claims, 10 Drawing Sheets

SLIDING MATERIAL FOR LIGHT METAL MATERIALS

BACKGROUND OF THE INVENTION

The present invention relates to a sliding material for a light metal material.

In automobile industry, seal members are widely utilized to prevent leakage of oil supplied to the hydraulic circuit, for example, for automatic transmission (refer to as AT). For the purpose of reducing the weight of AT, the majority of parts for use in AT is intended to be made of a light metal material such as aluminum based alloy (for example, ADC-12Z, Japanese Industrial Standard) so that seal rings are brought into sliding contact with the opponent or mating parts made of the light metal material. If the seal rings are made of steel metal material, such the mating parts made of the light metal material will be subjected to abnormally increased wear. Contrary to this, if the seal rings are made of a soft metal material, the sliding surfaces of the seal rings are subjected to excessive wear. In fact, it has been experienced that oil leakage amounts to 500~1000 cc/min. under oil pressure of 1MPa (about 10 kgf/cm$^2$) when the seal rings made of cast iron material were fitted into ring grooves formed on a rotatable shaft made of ADC-12Z.

In order to resolve the aforementioned oil leakage encountered in the combination of the seal ring made of the cast iron material and the shaft made of ADC-12Z, a seal ring made of a synthetic resin having a coefficient of a large thermal expansion is developed. However, this type of the seal ring has adverse effect on mating members made of aluminum based alloy which are slidable with respect to the seal rings, namely, an excessive amount of the wear occurs on the sliding surfaces of the mating members made of aluminum based alloy. To decrease a degree of the wear or abrasion, a seal ring made of polytetrafluoroethylene (refer to as PTFE), a seal ring made of polyether-ether ketone (refer to as PEEK) which is filled with carbon fibers and PTFE, or a seal ring made of a material composed of PEEK, carbon fibers, PTFE and powder of sericite is proposed (see Japanese Laid Open Patent Publication (KOKAI) 262976/1993). When this seal ring is used to prevent oil leakage between the seal ring and the opponent or mating member of aluminum based alloy which is in sliding contact therewith, the wear of such opponent or mating member is large and it was admitted that the seal ring of the aforementioned compositions is not useful in applications where the opponent or mating member of aluminum based alloy is highly desirable in view of the reduction of the weight.

SUMMARY OF THE INVENTION

Accordingly, a main objective of the present invention is to provide a sliding material for light metal materials which resolves the aforementioned drawbacks encountered in the prior art.

Further objective of the present invention is to provide a sliding material having a good wear resistance and adapted to suppress wear of a light metal material slidable with respect to the sliding material.

The objective of the present invention is attained by providing a sliding material, which is in sliding contact with a light metal material and seals oil applied to the sliding contact between them, comprising polyether-ether ketone and/or polyether-nitride, and further sericite, 20~35 wt % of sericite being added therein.

Preferably, a seal ring is made of the aforementioned sliding material and a rotatable or reciprocating shaft made of a light metal or aluminum based alloy is fitted with the seal ring.

The sliding material according to the present invention has a good wear resistance with respect to a light metal material which is also subjected to a low degree of the wear by means of the sliding material. Namely, the sliding material according to the present invention exhibits excellent wear resistance correlation with respect to sliding surfaces in oil between the sliding material according to the present invention and the opponent or mating light metal material. In other words, it is possible to suppress the wearing of the sliding material and the light metal material from exceeding a predetermined or fixed amount.

For example, the sliding material according to the present invention can be manufactured by extrusion or injection process of material which is composed of VICTRE-PEEK (tradename of I.C.I in UK) and/or polyether nitride, namely, PEN (by Idemitsu Chemical Company in Japan), and further sericite which is one of solid lubricants.

The sliding material according to the present invention contains sericite so that self-wear resistance property thereof is good and the wear level of the mating part such as ADC-12Z is also low. The fluidity of the sliding material is increased because carbon fibers are not added therein, so that manufacture of seal rings are easy. Preferably, 20~35 wt % of sericite is added in the base material composed of PEEK and/or PEN. More preferably, 30 wt % of sericite is added in the base material composed of PEEK and/or PEN, in view of the excellent self-wear resistance property of the sliding material and the lower wear level of the mating part such as the light metal material (for example, ADC-12Z). The dimensions of sericite is 325 mesh or less and mean diameter of about 10 µ and an appropriate amount of sericite is weighed and the weighed sericite is fed into an extrusion apparatus to form pellets. These pellets are charged into an injection molding machine to mold seal rings.

BRIEF DESCRIPTION OF THE DRAWINGS

The foregoing objects and other objects as well as the features of the present invention will become more apparent from the following description of a preferred embodiment in which the present invention is applied to a sliding member for light metal materials as shown in the accompanying drawings.

DETAILED DESCRIPTION OF THE PREFERRED EMBODIMENT

PEEK base material and/or PEN base material are filled with sericite having dimensions of 325 mesh or less and mean diameter of about 10μ. After these materials are mixed and agitated, the mixed materials are fed into an extrusion apparatus to form pellets. To provide test pieces of seal ring profile, these pellets are fed into an injection molding machine.

The seal rings made of a sliding material according to the present invention each has the dimensions of outer diameter 55 mm, inner diameter 50 mm and width 3 mm. The width is reduced from 3 mm to 2.5 mm by means of a grinder.

Comparative test pieces (A, A', B and C) of seal ring profile are molded by following materials.

A material: PEEK base material is filled with 15 wt % of carbon fibers and 15 wt % of PTFE.

A' material: PEN base material is filled with 15 wt % of carbon fibers and 15 wt % of PTFE.

B material: PTFE base material is filled with 10 wt % of carbon fibers and 30 wt % of bronze powder.

C material: PTFE base material is filled with 30 wt % of Sumi-Casper E101 (A trade name of Sumitomo Chemical Company in Japan).

The wear resistance property in a sliding state for each of the test pieces according to the present invention and the comparative test pieces is measured and the test conditions are listed in Table 1.

TABLE 1

| Test Instrument | Riken Type High Pressure Abrasion Teset Instrument |
|---|---|
| Abrasion Speed | 2 m/s |
| Abrasion Time | 1 hr |
| Contact Weight | 50 kg (Surface Pressure = 1.2 MPa) |
| Friction Type | ATF Lubricatated sliding friction ATF oil supply 200 cc/min. Oil Temperature 50° C. |

A mating part made of ADC-12Z (JIS, Japanese Industrial Standard) has dimentions of outer diameter 80 mm, inner diameter 20 mm, and thickness 10 mm. Oil of ATF is supplied through the central aperture of 20 mmφ to the mating part.

Figure 1:
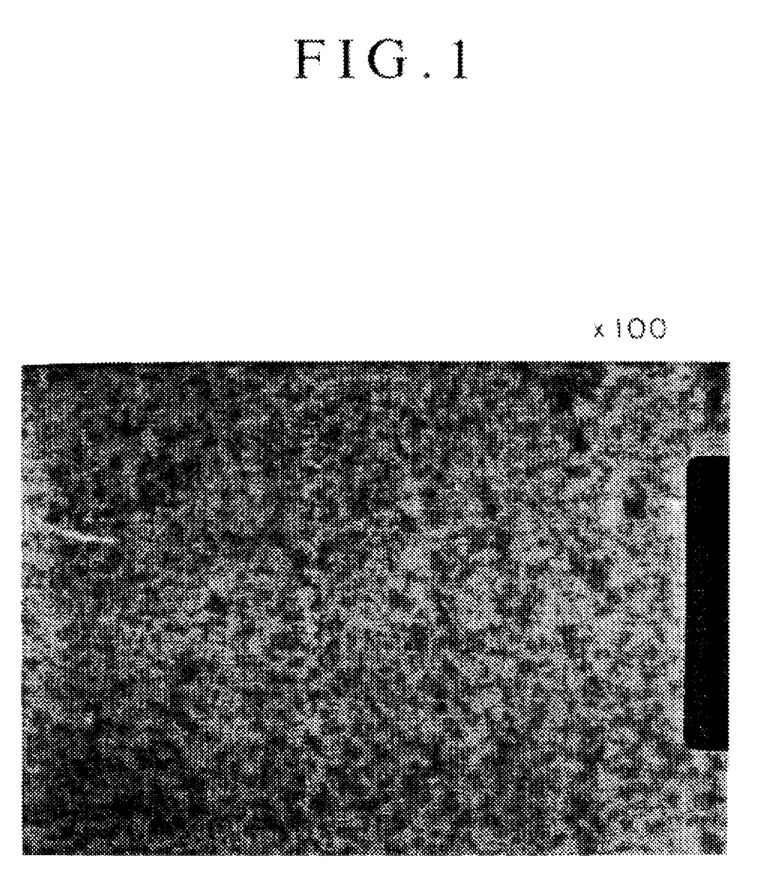
FIG. 1 is a microphotograph (×100) of the structure in a material where PEEK base material according to the present invention is filled with sericite.
Figure 2:
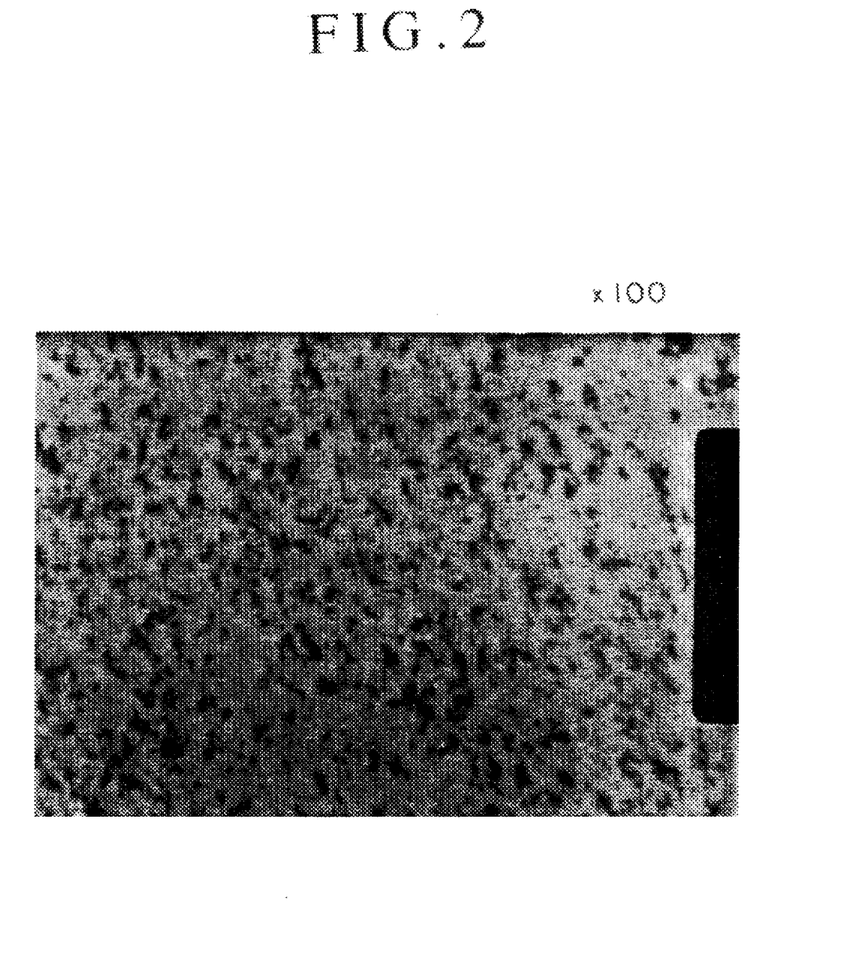
FIG. 2 is a microphotograph (×100) of the strucutre in a material where PEN base material according to the present invention is filled with sericite.

The microscopic structures of the sliding materials according to the present invention are shown in FIGS. 1 and 2 wherein PEEK and PEN are observed in white parts and sericite as filling material is observed in dark parts which serves in keeping a low wear level.

The injection molding conditions to make the test pieces are as follows.

Die temperature: 150° C.
Nozzle temperature: 400° C.
Injection pressure: 1500 kg/cm²

Figure 3:
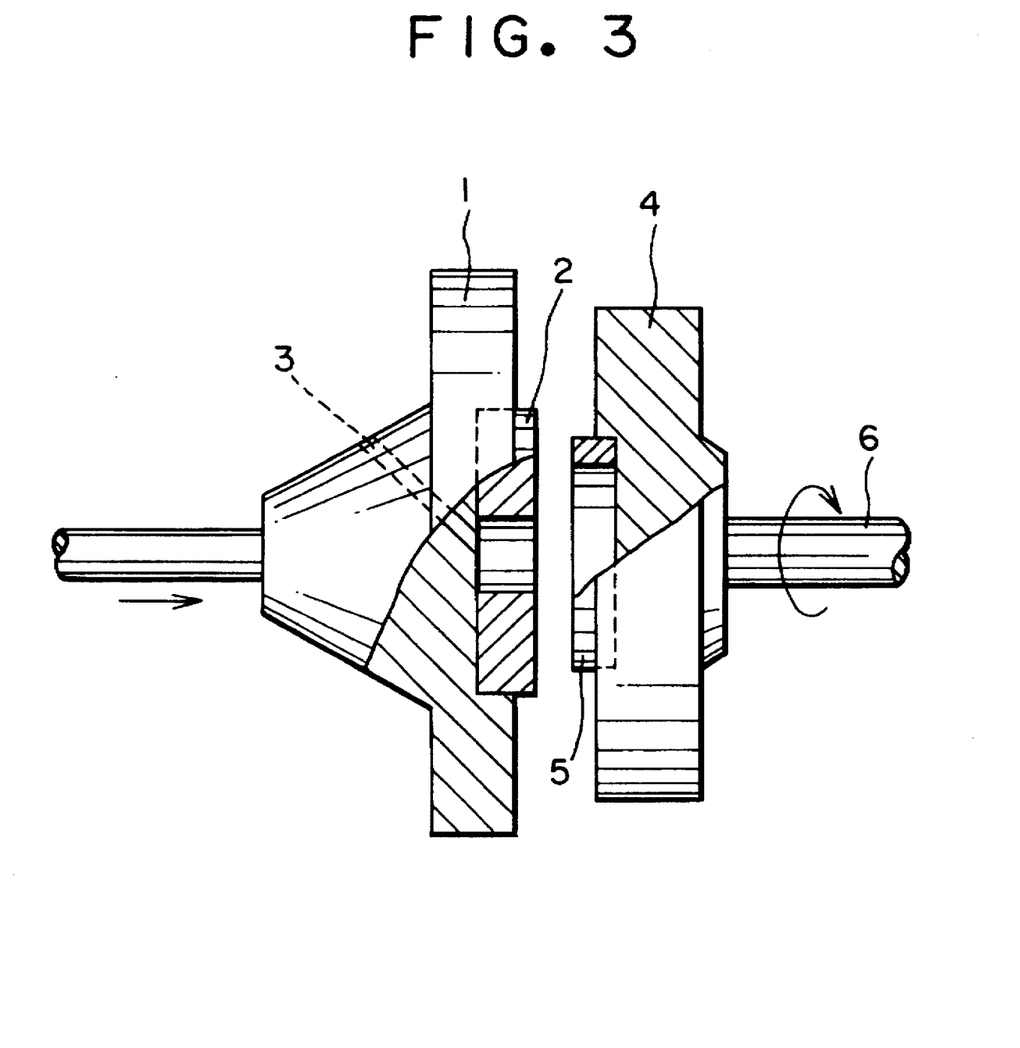
FIG. 3 is a view showing a wear or abrasion test apparatus.
Figure 4:
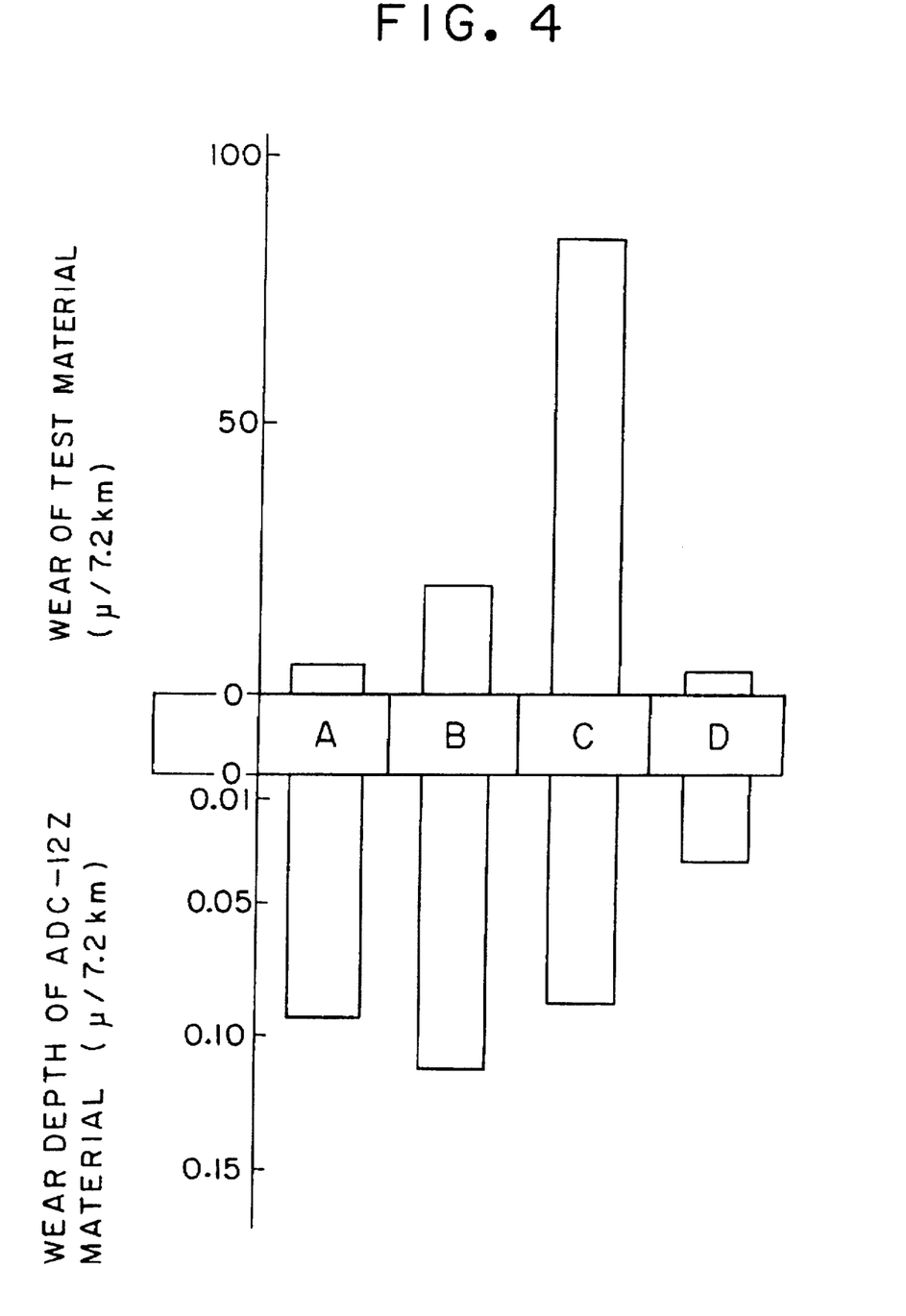
FIG. 4 is a graph showing results of wearing tests comparing a PEEK base material according to the present invention and comparative synthetic resin materials.
Figure 5:
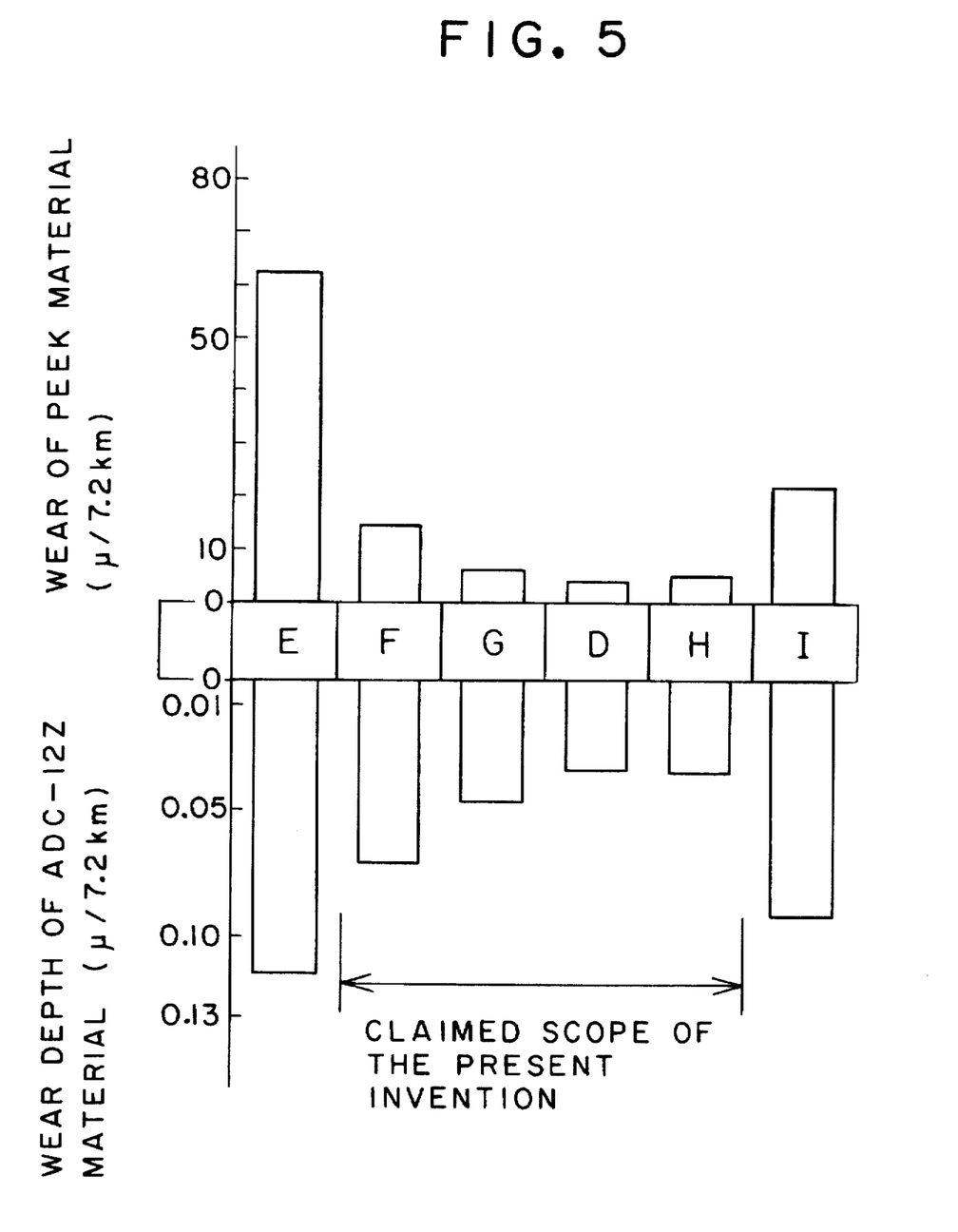
FIG. 5 is a graph showing results of wearing tests where PEEK is used as a base material.
Figure 6:
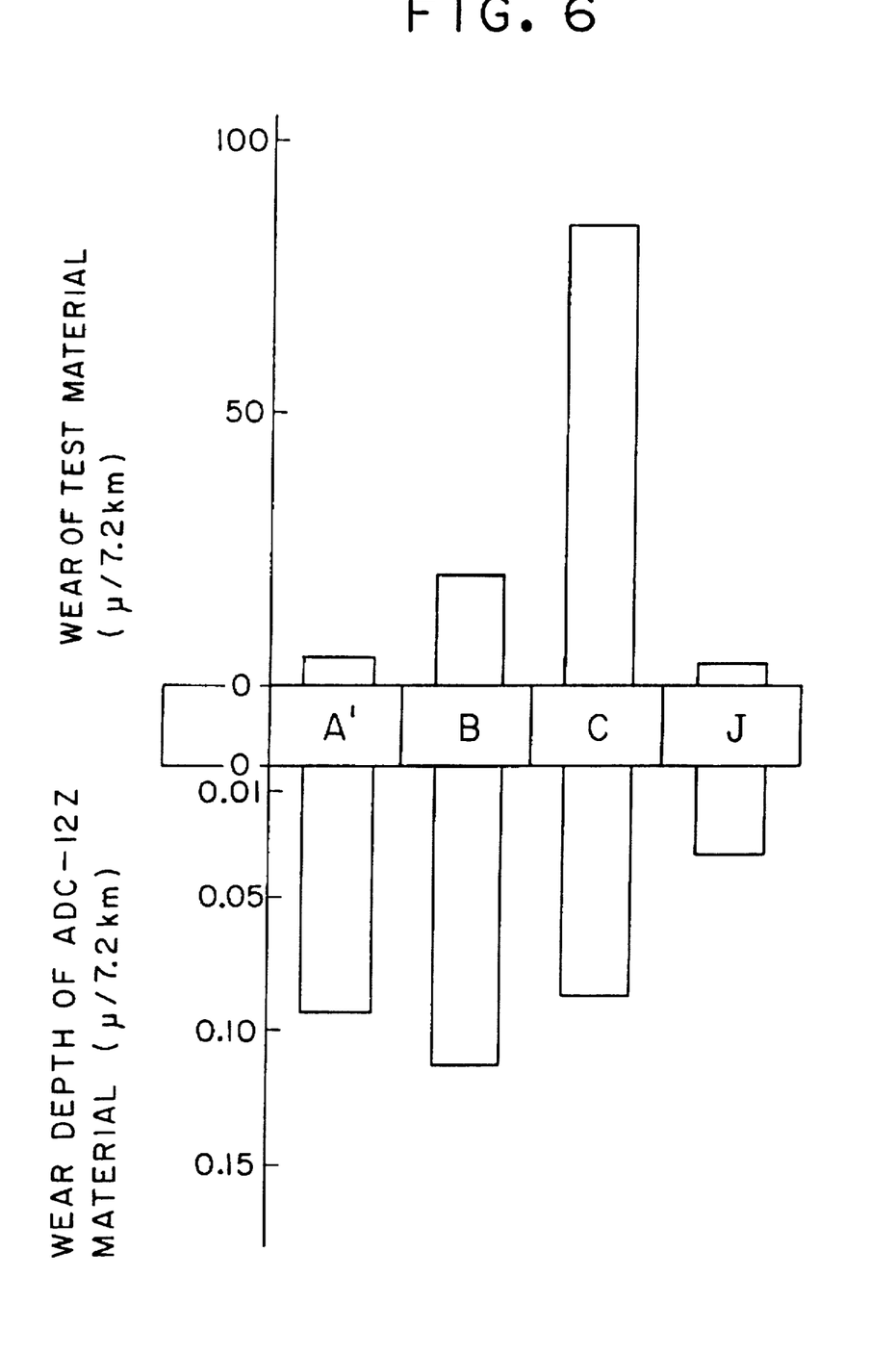
FIG. 6 is a graph showing result of wearing tests comparing a PEN base material according to the present invention and comparative synthetic resin materials.
Figure 7:
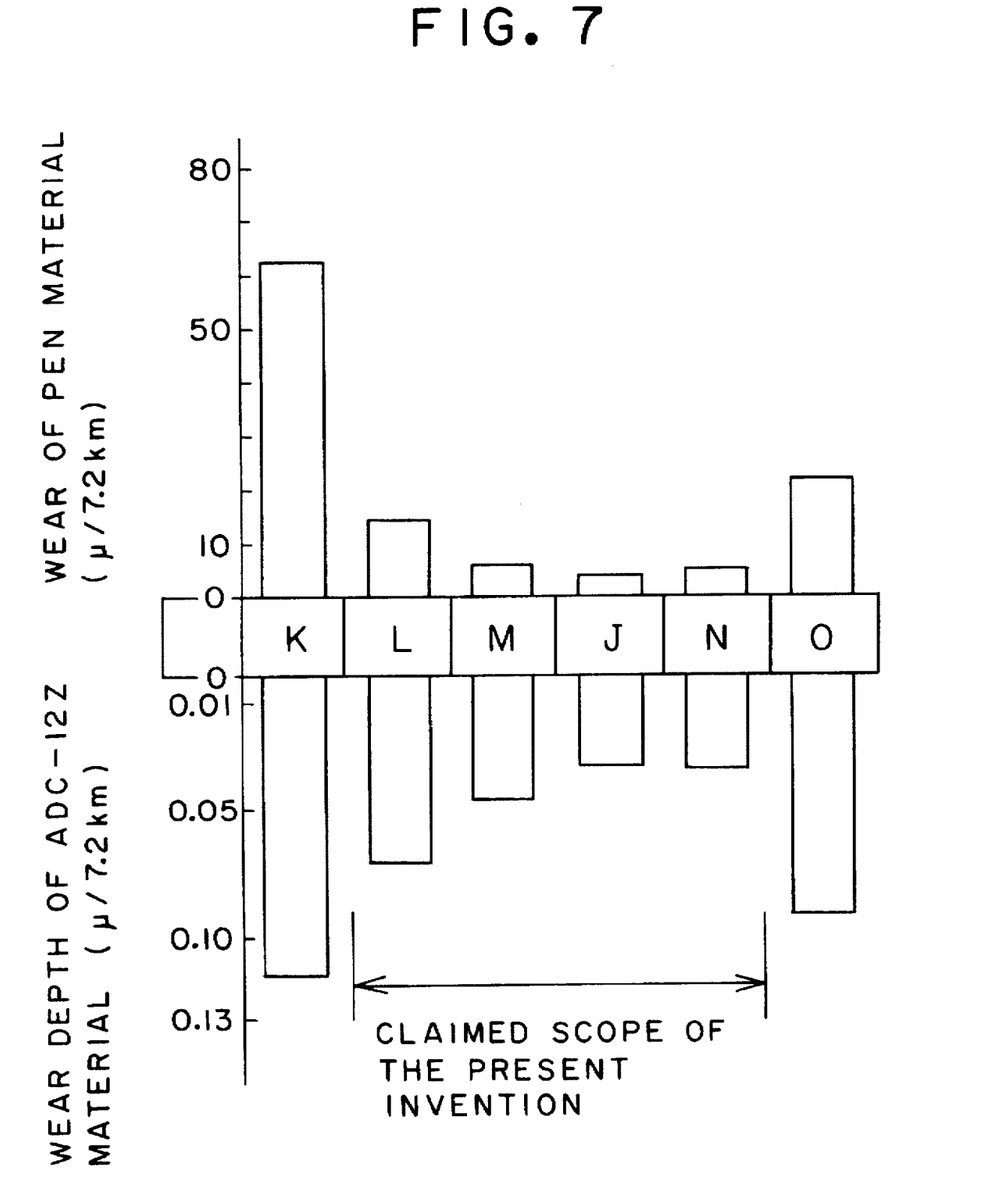
FIG. 7 is a graph showing results of wearing tests where PEN is used as a base material.

FIG. 3 shows a wear or abrasion test apparatus in outline where a disc holder 1 is detachably fitted with a disc 2 made of aluminum based alloy (ADC-12Z) and having dimensions of diameter 80 mm and thickness 10 mm. Lubricating oil is applied at the center of the disc 2 through oil passage 3 formed therein. The predetermined pressure P is exerted on the left side (in FIG. 3) of the disc holder 1 by a suitable hydraulic apparatus (not shown). A test piece holder 4 is connected to a rotatable shaft in a fashion that the rotatable holder 4 is opposed to the holder 1. A test piece 5 in a ring shape, which is detachably secured to the holder 4, has dimensions of an outer diameter 55 mm, an inner diameter 50 mm and width 2.5 mm.

In this test apparatus the predetermined pressure P is applied to the disc holder 1 so as to press the disc 2 of aluminum based alloy against the test piece 5. While applying the pressure P the test piece holder 5 is rotated at a fixed rate and oil is supplied through the oil passage 3 to the sliding surfaces between the test piece 5 and the disc 2.

This test apparatus was operated under the following test conditions.

1) Comparative Test Pieces of Seal Ring Profile Manufactured by Following Materials A material: PEEK base material is filled with 15 wt % of carbon fibers and 15 wt % of PTFE.

A' material: PEN base material is filled with 15 wt % of carbon fibers and 15 wt % of PTFE.

B material: PTFE base material is filled with 10 wt % of carbon fibers and 30 wt % of bronze powder.

C material: PTFE base material is filled with 30 wt % of Sumi-Casper E101 (trade name of Sumitomo Chemical Company in Japan).

2) Test Pieces (Ring shape) according to the present invention

D-0 materials listed in Tables 2 and 3.

3) Contact Surface Pressure

Pressure of 12 kg/cm² is exerted on the disc holder 1 by the suitable hydraulic apparatus. While applying the pressure of 12 kg/cm² to the disc holder, the disc 2 is brought into sliding contact with each test piece 5 under the condition of a fixed pressure and oil is supplied through the oil passage 3 to the sliding surfaces of the disc 2 and each test piece 5.

Lubricant Oil: ATF

Oil Temperature: 80° C.

Oil Supply Rate: 200 cc/min.

4) Running Distances

Running distance (or duration): 7.2 km

Speed of relative rotation between the disc 2 and each test piece 5: 2 m/s

5) Measures

After running each test piece by distances of 7.2 km, the disc 2 and each test piece 5 are detached from the test apparatus. In the case of the disc 2, sectional areas of total traces of the wearing in the form on annular grooves which are produced on the sliding surface of the disc 2 are measured and in the case of each test piece 5 an amount of the wearing is measured.

TABLE 2

| Sample | D | E | F | G | H | I |
|---|---|---|---|---|---|---|
| PEEK | 70 | 85 | 80 | 75 | 65 | 60 |
| Sericite | 30 | 15 | 20 | 25 | 35 | 40 |
| Tensile Breaking Strength | 410 | 870 | 730 | 550 | 255 | 130 |

TABLE 3

| Sample | J | K | L | M | N | O |
| --- | --- | --- | --- | --- | --- | --- |
| PEN | 70 | 85 | 80 | 75 | 65 | 60 |
| Sericite | 30 | 15 | 20 | 25 | 35 | 40 |
| Tensile Breaking Strength | 550 | 1050 | 880 | 650 | 305 | 155 |

The results obtained are shown in FIGS. 4–7. When PEEK base material for test pieces and ADC-12Z for disc were used (see FIGS. 4 and 5), a large amount of the wearing is seen in the test pieces made of A, B, C, E and I materials. When PEN base material for test pieces and ADC-12Z for disc were used (see FIGS. 6 and 7), a large amount of the wearing is seen in the test pieces made of A', K and O materials.

In FIGS. 4–7, each upper part shows an amount of the wearing for 7.2 km running distances of each test piece and each lower part shows mean wear depth of wear trace for 7.2 km running distances of each disc (test piece of ADC-12Z). As is apparent from these Figures, test pieces of B and C exhibit self-large wear level and mating parts therefor exhibit large wear level. The wear level of test pieces of A and A' is the same as that of the test pieces according to the present invention and the wear level of the mating parts (ADC-12Z) is high.

With respect to the wear correlation of a filling amount of sericite with the mating material of ADC-12Z, it was found that the use of 20 wt % or less of sericite has adverse effect on the wear correlation and the use of 35 wt % or more of sericite shows a low level of the tensile breaking strength property. A peeling off of sericite from the sliding surface is likely to occur.

From the test results obtained it was found that the most excellent sliding property is obtained from the test piece made of the material containing PEEK and/or PEN base materials, and about 30 wt % of sericite (350 mesh or less). Sericite is soft and does not make the mating part of aluminum based alloy injured.

In view of a new application field that the seal rings made of the sliding material according to the present invention are fitted into annular groove formed on a rotatable shaft (ADC-12Z) for AT, seal rings according to D material were prepared, each has dimensions of outer diameter 52 mm, width 2.3 mm and thickness 2.3 mm.

Figure 8:
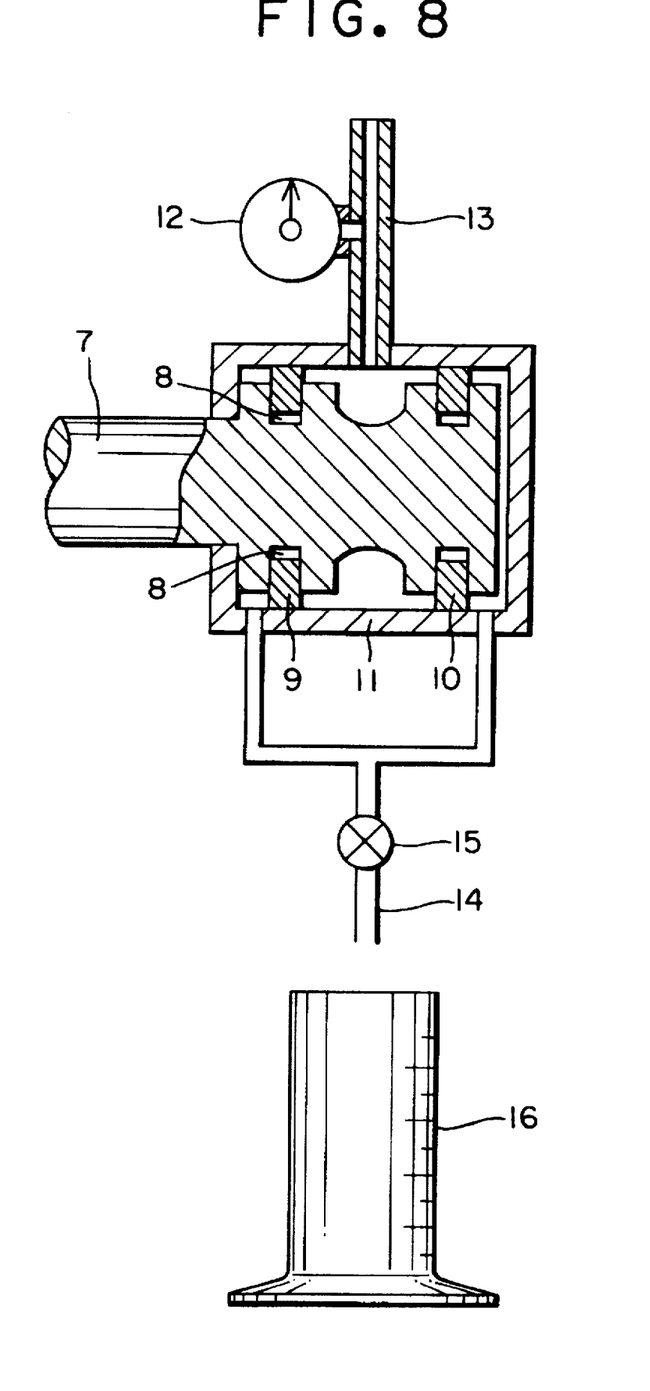
FIG. 8 is a sectional view showing an oil leakage test apparatus.

FIG. 8 shows a test apparatus for performing tests of a wear resistance of the shaft of ADC-12Z, a sealability of the seal ring of D material slidable with respect to the shaft of ADC-12Z and a durability of the excellent sealing performance. A rotatable shaft 7 is made of ADC-12Z and provided at its outer peripheral surface with a pain of annular ring grooves 8,8 in which seal rings 9, 10 are fitted. Outer peripheral surfaces of the seal rings 9, 10 are in sliding contact with an inner surface of a housing 11 made of carbon steel (S45 C of Japanese Standard), while the shaft 7 is rotated. Oil supply conduit 13 with an oil gage 12 is attached to a place of the housing 11 between the seal rings 9, 10 and also an oil drain conduit 14 with a valve 15 is attached to a bottom wall of the housing 11. Oil leaked from the sealing rings 9, 10 is charged in a cup 16 through the drain conduit 14 and an amount of oil in the cup 16 is measured.

The test conditions were as follows.

Oil: Mission Oil for Automatic Transmission
Speed of Shaft: 2,000 rpm
Oil Pressure: 12 kg/cm$^2$
Test Duration: 50 hrs.

Figure 9:
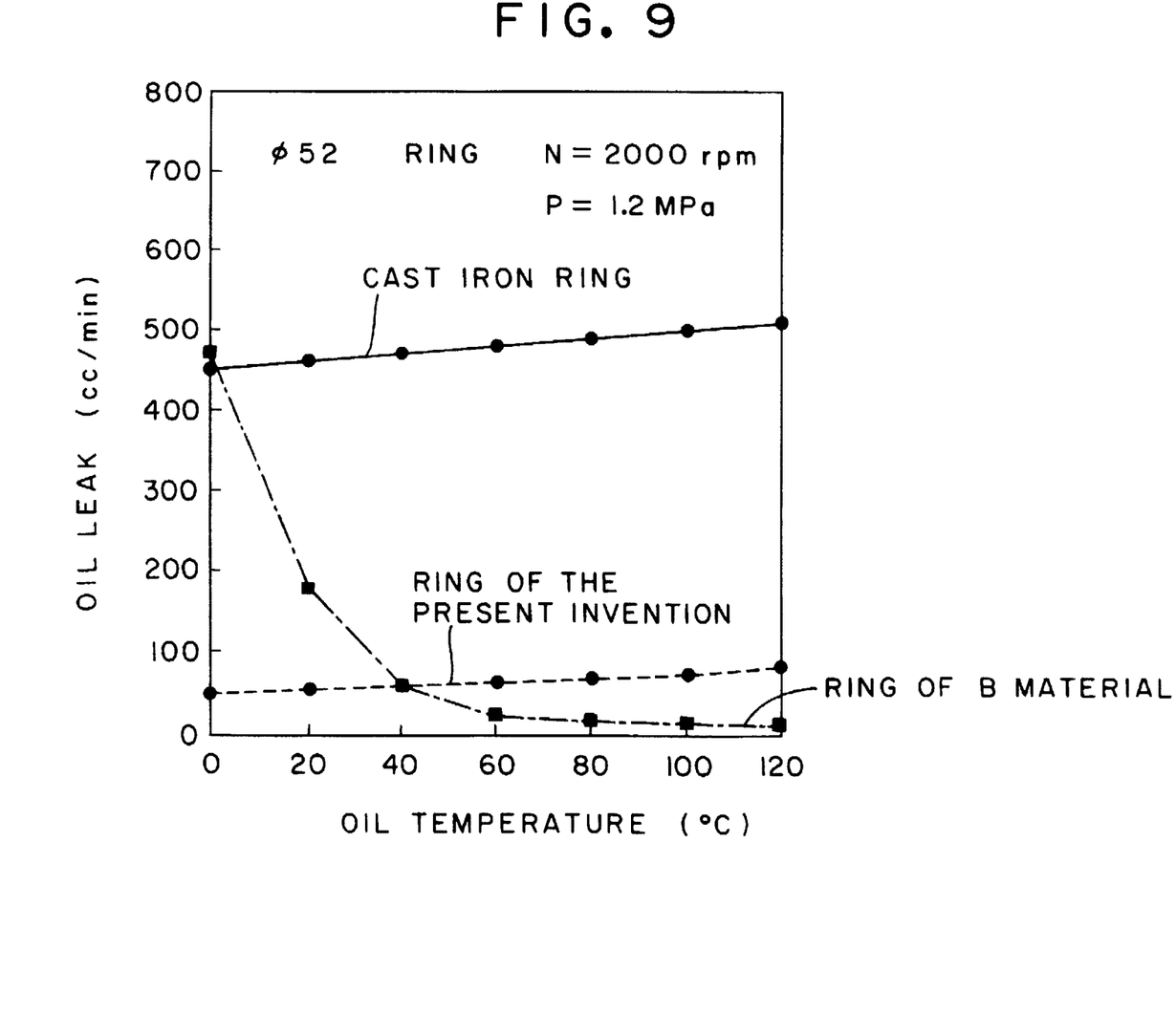
FIG. 9 is a graph showing a result of the oil leakage test comparing a seal ring made of D material according to the present invention and a piston ring made of a conventional material.

FIG. 9 shows the measured results of oil temperature variation and oil leakage after the durability test. The oil leakage test was conducted by using the seal ring made of D material (see Table 2) according to the present invention, the seal ring made of B material and the conventional cast iron seal ring. The seal ring according to the present invention exhibits a stable sealability and less increase in oil leakage in a wide range of oil temperature variation.

Figure 10:
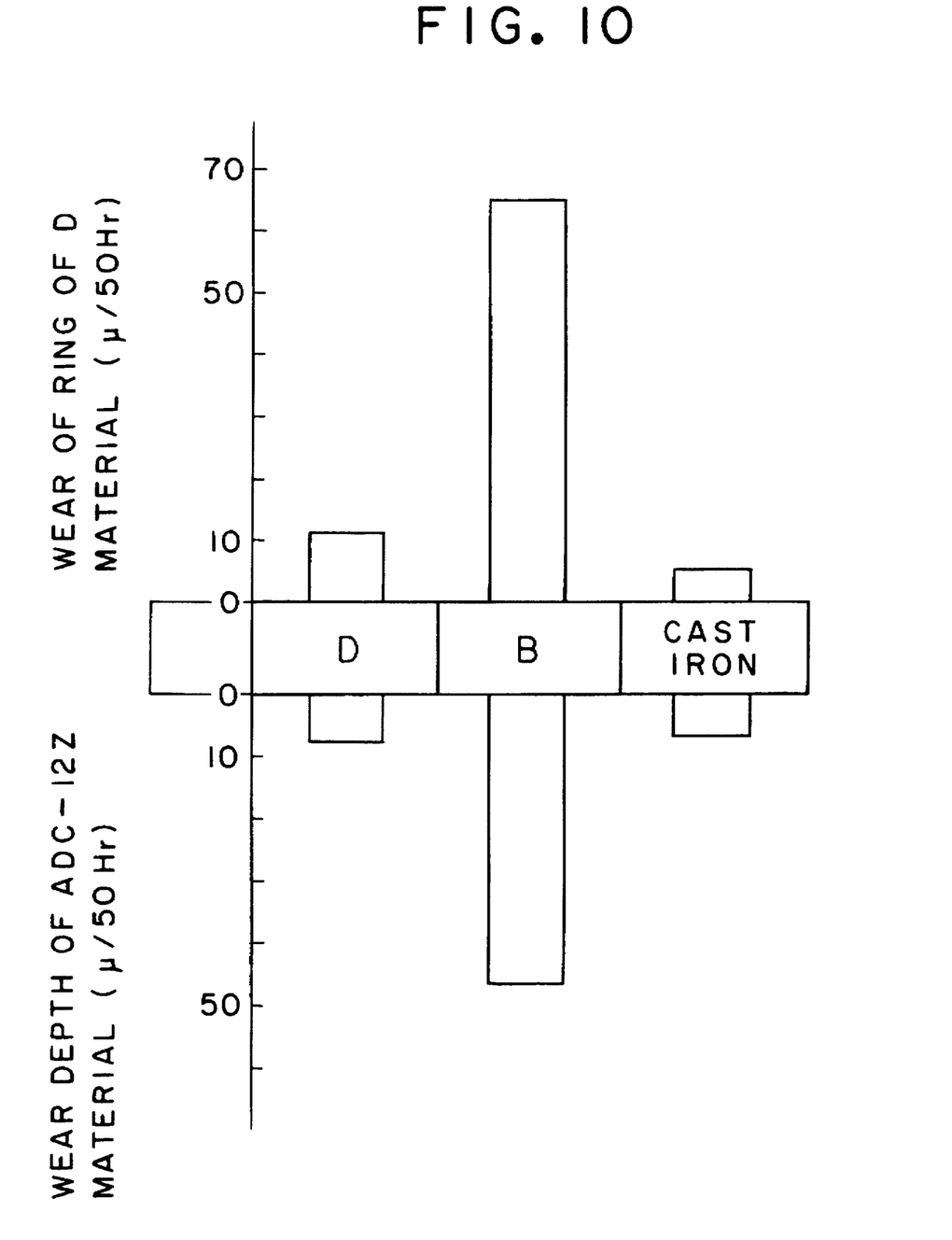
FIG. 10 is a graph showing a result of the durability test for 50 hours where the test apparatus illustrated in FIG. 8 is used and D material according to the present invention, the conventional material and ADC-12Z are compared by using for seal rings and a shaft.

FIG. 10 shows the amounts of the wear of the sliding surfaces of the seal rings and the wear of the shafts (ADC-12Z) at the oil temperature of 120° C. . It is seen that the seal ring of D material according to the present invention shows low wear level.

J material according to the present invention contains PEN base material and 30 wt % of sericite (350 mesh or less) and the durability test of the seal ring made of J material was conducted under the same conditions as mentioned above. The oil leakage was measured. The test results was the same as the test result of the seal ring of D material. Namely, the seal ring of J material exhibits a stable sealability and less increase in oil leakage in a wide range of oil temperature variation.

Although certain preferred embodiments have been shown and described, it should be understood that many changes and modifications may be made therein without departing from the scope of the appended claims.

What is claimed is:

1. A sliding material, which is in sliding contact with a light metal material and sealing oil applied to the sliding contact surface between them, consisting of polyether-ether ketone and sericite, 20–35 wt % of sericite being added therein.

2. A sliding material, which is in sliding contact with a light metal material and sealing oil applied to the sliding contact surface between them, consisting of polyether-nitride and sericite, 20–35 wt % of sericite being added therein.

3. A sliding material which is in sliding contact with a light metal material and sealing oil applied to the sliding contact surface between them, consisting of polyether-ether ketone, polyether-nitride and sericite, 20–35 wt % of sericite being added therein.

4. A seal ring manufactured according to claim 1.

5. A seal ring manufactured according to claim 2.

6. A seal ring manufactured according to claim 2.

* * * * *